United States Patent [19]

Hollrock

[11] Patent Number: 4,695,087
[45] Date of Patent: Sep. 22, 1987

[54] CONVERTIBLE TRUCK BED FOR PICKUP

[75] Inventor: J. Richard Hollrock, Simsbury, Conn.

[73] Assignee: Hollrock Engineering, Inc., Granby, Conn.

[21] Appl. No.: 814,636

[22] Filed: Dec. 30, 1985

[51] Int. Cl.[4] .............................................. B60J 7/10
[52] U.S. Cl. ...................................... 296/14; 296/182; 296/32; 296/100; 296/26
[58] Field of Search ................... 296/10, 14, 181, 182, 296/191, 32, 35.3, 36, 35.1, 37.6, 13, 100, 26

[56] References Cited

U.S. PATENT DOCUMENTS

| | | | |
|---|---|---|---|
| 991,607 | 5/1911 | Cowles | 296/13 |
| 2,856,225 | 10/1958 | Selzer | 296/32 X |
| 2,984,514 | 5/1961 | Lemley | 296/14 |
| 2,993,727 | 7/1961 | Zewiske | 296/13 |
| 3,768,858 | 10/1973 | Boismier | 296/100 |
| 4,199,186 | 4/1980 | Faverino | 296/13 |
| 4,405,170 | 9/1983 | Raya | 296/10 |

*Primary Examiner*—Robert B. Reeves
*Assistant Examiner*—Russell D. Stormer
*Attorney, Agent, or Firm*—McCormick, Paulding & Huber

[57] ABSTRACT

A flatbed for a pickup truck has adjustable length legs that support several flat panels at the height of the pickup body sides. Two central panels are movable to permit conventional loads to be carried and to be supplemented as well. When layed flat outsize cargo can be conveniently carried. Side rails are pivotably provided along the marginal edges of the platform or bed.

8 Claims, 12 Drawing Figures

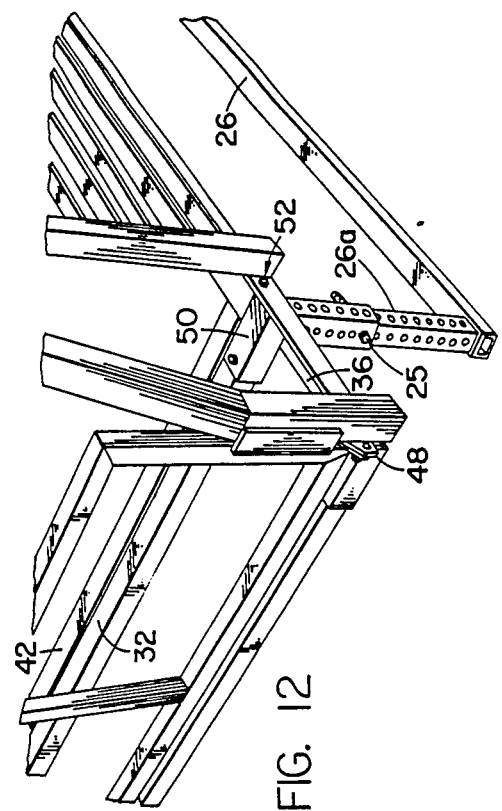
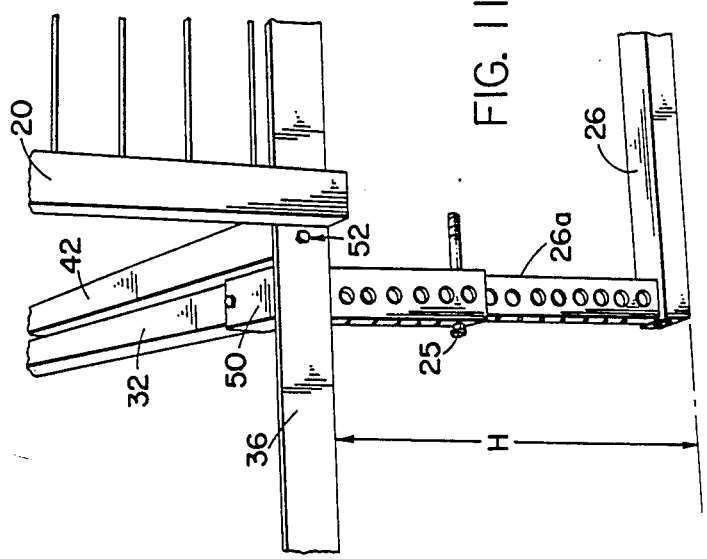
FIG. 12
FIG. 11

CONVERTIBLE TRUCK BED FOR PICKUP

This invention relates generally to beds for truck bodies of this type provided on conventional pickups, and deals more particularly with an improved truck bed frame and panel structure especially suited for a pickup truck body to provide a flat uninterrupted surface considerably larger than the floor of the pickup for hauling outsize cargo items.

SUMMARY OF THE INVENTION

In accordance with the present invention a conventional pickup truck body is adapted for hauling large items too big to fit on the conventional floor of the pickup due to restrictions in size, particularly with regard to the spacing between the sides of the pickup body and the height of these sides above the pickup body floor.

A truck bed frame for such a pickup body is provided and this frame has first and second lower leg portions corresponding in width to that of the pickup truck body (sides) and the lower end portions thereof abut longitudinally spaced locations of the floor preferably fore and aft of the wheel wells for the pickup. These leg portions have uppers ends at a height H above the lower ends so that their height corresponds closely to that of the height of the pickup body sides themselves.

Two longitudinally extending rail members are supported on these leg portions and are spaced from one another by a dimension at least approximately equal to that between the pickup body sides.

The frame includes a forward bulkhead supported by forward ends of these longitudinally extending members and this bulkhead includes laterally outwardly extending shelf support portions. At the rear end of these longitudinally extending rail members shelf support struts are provided and a marginally extending shelf support portion is provided between these struts and the bulkhead defined shelf support portions.

Platform defining panel means in the form of two pivotally mounted platform panels are provided on these longitudinally extending rail members, and shelf panels are provided on the shelf support portions so that a flatbed is provided only slightly above the height of the sides of the pickup body itself.

In its presently preferred form these platform panel means comprise two platform panels with a combined width A dictated by the width of the truck body's interior floor, and a length B which is greater than the length of the floor of the pickup body itself. The two platform panels are supported by means defined on the bulkhead and by one or more cross braces or support bars removably provided between the longitudinally extending frame members.

The platform panels thereby provide a flatbed surface of width greater than A, when combined with that of the shelf panels, and a length B also greater than that of the truck body floor.

Finally, side rails are provided, pivotably, on the outer marginal edges of the shelf portions to restain outsize cargo carried on the flatbed so defined. These rails are also adapted to be swung downwardly out of the way in the event that even larger cargo is to be carried, and in their upright positions means is provided for locking these rails with the result that the hinged or pivotally mounted floor panels can be raised and layed against the rails to provide increased capacity to the pickup body itself for carrying bulk material.

BRIEF DESCRIPTION OF THE DRAWINGS

FIG. 5 is a view similar to FIG. 3 but illustrating the side rails in their lowered position to provide an interrupted flat surface for receiving cargo of the like.

FIG. 11 is a detailed view of the right forward corner of the frame.

FIG. 12 is a perspective view looking down on the right forward corner of the frame.

DETALED DESCRIPTION

Figure 2:
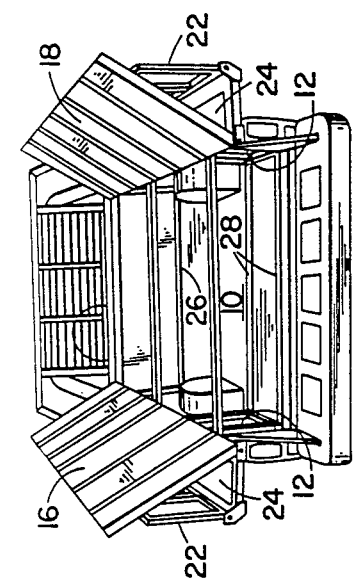
FIG. 2 shows the pickup truck and structure of FIG. 1 with the panels in their raised configuration resting against the side rails.
Figure 1:
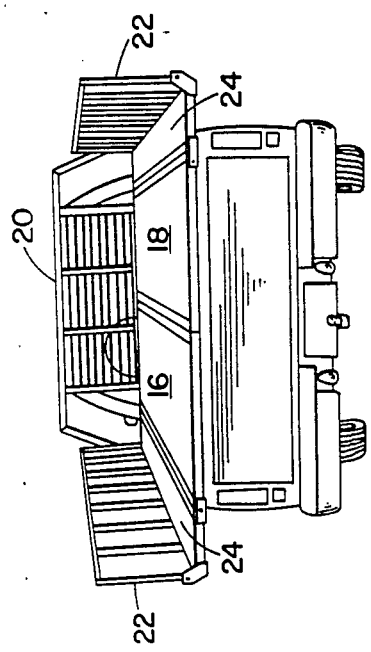
FIG. 1 shows a pickup truck equipped with a flatbed frame and associated panel structure in accordance with the present invention. The panels are provided in position to receive outsize cargo and the side rails are locked in their upright condition in this view.

Turning now to the drawings in greater detail, FIG. 1 illustrates a pickup truck of conventional configuration, which truck is also shown in FIG. 2 as having a pickup truck boy portion having a floor 10 and sides 12 defining a generally rectangular floor shape dictated by the lateral dimension between the truck body sides and the longitudinal dimension thereof. The rectangular floor area so defined is limited and the present disclosure provides a very efficient structure for increasing both these dimensions to provide a flat area of increased lateral and longitudinal size. A tailgate may be conventionally provided on the pickup truck body and is shown lowered in FIG. 2. FIG. 1 shows the tailgate in its raised configuration and it is noted that the tailgate maybe raised or lowered without interferring with the operation of the convertible truck bed for pickups as described herein.

Figure 3:
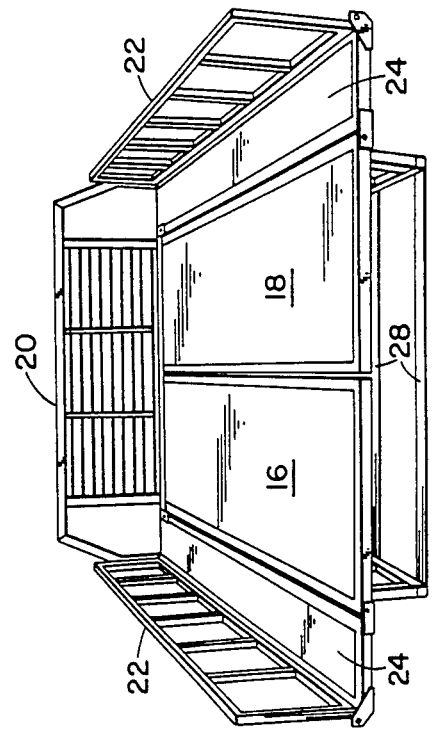
FIG. 3 is similar in many respects to FIG. 1 except that the structure of the present invention is shown outside of the pickup body environment.

FIG. 3 illustrates a truck bed of the present invention after it has been removed from the truck body. This frame comprises two platform defining panels 16 and 18, which panels are provided in a common plane as shown at FIG. 3 and FIG. 1. These panels can be raised to positions as shown in FIGS. 2 and 4.

Figure 4:
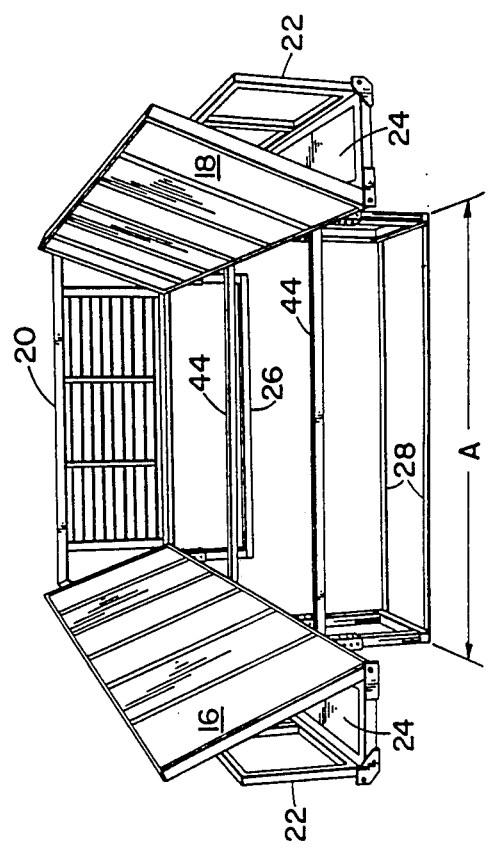
FIG. 4 is similar for FIG. 3 but illustrates the floor panels in their raised condition.
Figure 5:
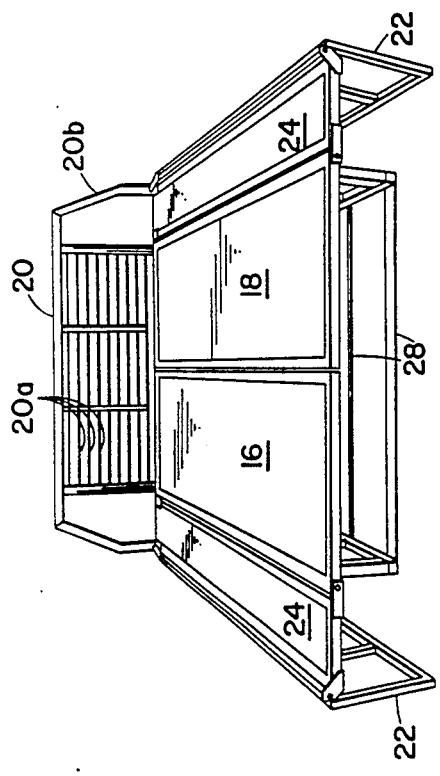

The frame also includes a forward bulkhead 20 best shown in FIG. 4, and side rails 22, 22 that are hingedly connected to the outer edges of shelf panels 24, 24. FIG. 5 shows these rails 22 lowered as contrasted with FIGS. 1-4 wherein these rails are in their raised positions.

FIGS. 6-12 inclusively illustrate the frame for the truck bed, with the bed defining portions, that is panels 16, 18 and 24 removed for clarity.

Figure 6:
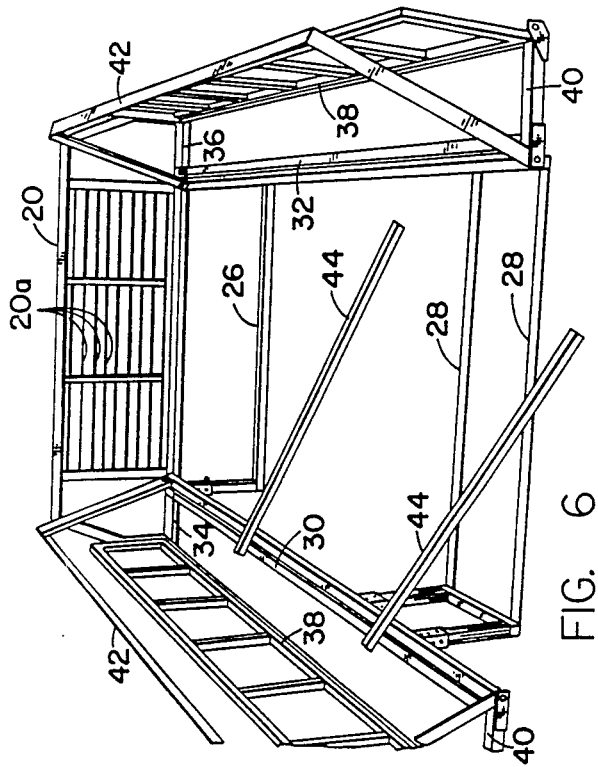
FIG. 6 is a view of the frame with the panel structure removed and with cross brace support bars shown as removed to illustrate the frame of the present invention.
Figure 10:
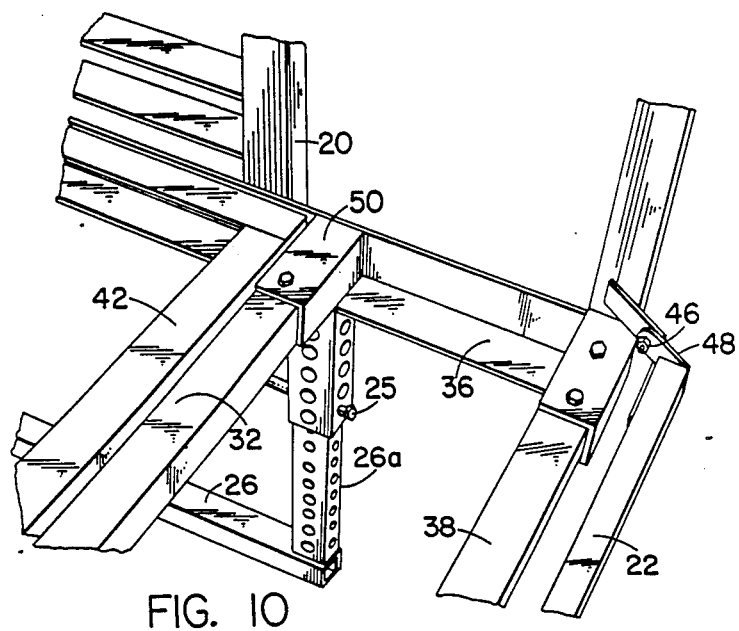
FIG. 10 is a detailed view of the connection means provided between the longitudinally extending frame members to which the panel are pivotably mounted and the manner of attachment for the forward end of this member to the bulkhead of the frame.

With particular reference to FIG. 6 the truck bed frame has forward and rear lower leg portions, 26 and 28, respectively, each of which is of a generally U-shaped configuration and has a lower end adapted to abut and be supported by the truck body floor 10 (see FIG. 2). The upper ends of these leg portions define the height H above the lower ends corresponding to the height of the sides of the truck pickup body. These upright leg portions are preferably adjustable in length to accommodate the frame to truck bodies of different side height. FIG. 11 shows this feature to best advantage. A removable pin 25 is inserted in aligned openings provided in the two-piece leg 26a. The forward leg portion 26 is provided generally below the forward bulkhead 20 of the frame. FIG. 12 illustrates the front leg portion 26 with its upright adjustable length leg 26a from a different vantage point. FIG. 10 shows this same lower leg portion and the bulkhead 20 with the adjustable length upright leg portion 26a therebetween.

The rear U-shaped leg portion 28 is preferably provided in the form of a pair of parallel base members as indicated generally adjacent the floor 10 of the pickup in FIG. 2 and two upright portions 28a, 28a which portions are adjustable in length to match the height of the sides of the pickup body as with the uprights 26a referred to previously. The parallel base members 28 are interconnected by a cross brace as indicated generally at 29 in FIG. 9.

The frame of FIGS. 6-12 further includes two longitudinally extending members 30 and 32, which longitudinally extending support members are provided in parallel relationship to one another and are spaced from one another by a dimension at least approximately equal to the dimension A dictated by the width of the pickup truck body. These frame members 30 and 32 are supported on the upper end portions of the legs 26 and 28, and the forward ends of these members 30 and 32 are provided in anchored relationship to the bulkhead 20 as suggested generally at 50 in FIG. 10.

The frame according to the present invention further includes laterally outwardly extending shelf support portions 34 and 36 defined for this purpose in the bulkhead 20. Longitudinally extending shelf margin portions 38, 38 are provided in spaced relationship to the members, 30 and 32, respectively, and are provided in the same plane as said frame members 30 and 32. These shelf margin portions 38, 38 are supported at their forward ends in the bulkhead 20 and are supported adjacent their rearward ends by shelf support struts 40, 40 best shown in FIG. 8. Shelf panels are provided in the generally rectangularly shaped openings so defined, that is by the longitudinally extending frame members 30 and 32 together with the parallel shelf margin portions 38, 38.

Platform defining panel means is provided on the longitudingally extending frame members 30 and 32, and in its presently preferred form this platform is more particularly defined by the two panels 16 and 18 having a combined width A when the panels are oriented in their flat configuration as suggested in FIGS. 1, 3 and 5. Means is provided for pivotably connecting each of these platform panels to one of the two longitudinally extending frame members 30 and 32. Preferably said means takes the form of a hinge joint as suggested at 52 in FIG. 8 at the rear end of the structure with a similar hinge pin 52 being provided at the forward end adjacent to the permanent joint indicated generally at 50 in FIG. 10. Each of the platform panels 16 and 18 has a generally rectangular outer frame 42, as indicated generally at 42 in the drawings (see particularly FIG. 6) which open frame 42 is provided with a solid portion such as indicated previously at 16 and 18 in FIGS. 1-5.

The panels 16 and 18 are supported in the positions shown in FIGS. 1, 3 and 5 by at least one and preferably two support bars provided for this purpose in the positions shown for them in FIG. 4. FIG. 6 illustrates these bars 44, 44 prior to being inserted predetermined locations defined for them in the longitudinally extending frame members 30 and 32.

Figure 8:
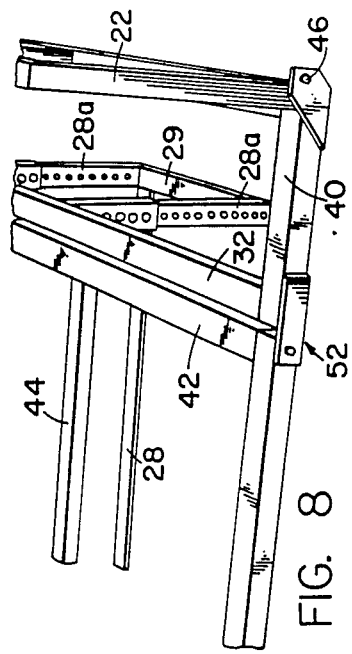
FIG. 8 is a detailed view of the rear right-hand portion of the framework illustrated in FIG. 7.
Figure 7:
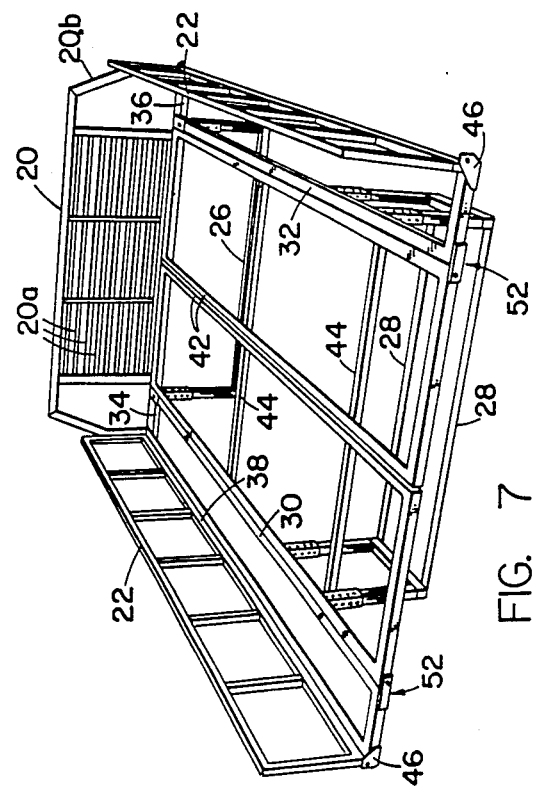
FIG. 7 is a view of the frame assembly, again without panels, but with the support bars in place, the side rails being provided in their upright condition as shown in FIGS. 1, 2, 4 and 6 and the platform panel frames layed flat as in FIGS. 1, 3 and 5.
Figure 9:
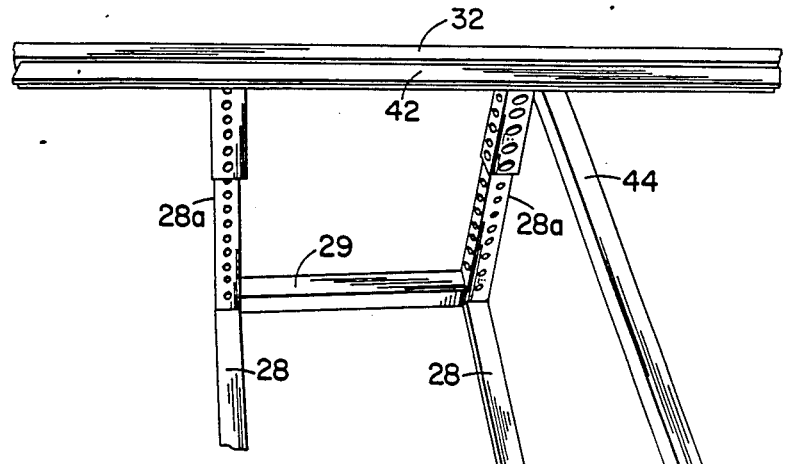
FIG. 9 shows the rear leg portion of the frame illustrated in the drawings.

In further accordance with the present invention the forward bulkhead 20 preferably includes a central portion that is defined by an open grill work as suggested generally at 20a in the drawings so that the driver of the pickup will be able to see rearwardly through his rear window when the truck bed of the present invention is provided on his truck body. Corner frames 20b are also included as part of this bulkhead 20 to assist in restraining loads carried on the flatbed body defined by the panels 16, 18 and 24 (see FIG. 5). In the event that loads are to be carried which are to be further restrained the pivotably mounting side rails 22, 22 can be raised to positions shown in FIGS. 1-4. These side rails are pivotably secured to the outer marginal edge portions of the shelf margin portions 38. The front hinged joint is illustrated in some detail in FIG. 10 with the hinge pin being indicated generally at 46 in this view. A hinge pin 46 illustrated in FIG. 8 is aligned with that in FIG. 10 and supports the rear end of rail 22. The platform panels 16 and 18 and their frames 42 are similarly supported for pivotal movement in the frame structure as suggested at 52 in FIG. 8. The forward end of each panel is similarly supported so the panels 16 and 18 can be layed flat as shown in FIG. 1 to haul outsize loads. Raising these panels as shown in FIG. 2 permits the pickup truck to haul conventional loads, and to haul bulk material that would not fit in a conventional pickup truck. Support bars 44, 44 can be removed to provide an uninterrupted floor area in this latter configuration.

I claim:

1. A truck bed for a pickup truck body having a floor and sides of height (H) such that the floor area is limited to a generally rectangular shape dicated by a lateral dimension (A) between the truck body's sides and a longitudinal dimension B equal to the length of the floor, said truck bed comprising;
    (a) a removable frame having at least one lower leg portion of width (A) said lower leg end portion abutting the floor inside the truck body, said leg portion having an upper end at a height H above the lower end thereof.
    (b) said frame having two longidutinally extending members supported on said leg upper end portion and spaced from one another by a dimension at least approximately (A),
    (c) said frame having a forward bulkhead supported by forward ends of said longitudinally extending members, said bulkhead including laterally outwardly extending shelf support portions, (d) said frame having longitudinally extending shelf margin portions spaced outboard of and in the same plane as said longitudinal frame members, (e) at least two support struts extending between said longitudinal frame members and said shelf margin portions, (f) platform defining panel means provided on said longitudinally extending members, and shelf panels provided on said shelf support portions, said shelf margin portions and said shelf support struts, said platform panel means including at least two platform panels, each of said panels pivotably mounted to one of said longitudinally extending frame members, and said panels being movable to positions inclined outwardly and upwardly to form upwardly projecting sides of the truck body to increase the capacity of the basic truck body, and (g) side rails pivotably connected to said shelf margin portions, and means provided in part on said bulkhead for supporting said rails in upright positions perpendicular said plane.

2. The combination of claim 1 further characterized by panel support means defined by said bulkhead for supporting said panels in the plane of said longitudinal frame members, and panel support bars removably provided between said longitudinally extending frame members to cooperate with said bulkhead defined panel support means and so support said panels.

3. The combination of claim 1 wherein each leg portion comprises a U-shaped structure wherein each upright leg portion includes a first part fixed to the base of the U and a second part adjustably mounted to the first part to permit variations in the height (H) said leg portions to match variations in the height (H) different truck bodies.

4. The combination of claim 1 wherein said platform panel means have a length greater than (B) to provide an overhang ΔB which may vary depending upon the particular truck body with which the bed is used.

5. The combination with a pickup truck body having a floor and sides of height (H) above the floor and such that the floor has a length (B) and width (A), the improvement comprising a truck bed frame for said pickup body and comprising in combination:

(a) a removable frame having at least one lower leg portion of width (A) lower leg end portions abutting spaced locations of the floor inside the truck body, said leg portion having upper ends at a height (H) above the lower ends thereof, (b) said frame having two longitudinally extending members supported on said leg upper end portions and spaced from one another by a dimension at least approximately (A), (c) said frame having a forward bulkhead supported by forward ends of said longitudinally extending members, said bulkhead including laterally outwardly extending shelf support portions, (d) said frame having longitudinally extending shelf margin portions in laterally spaced locations parallel to and in the same plane as said longitudinal frame members.

(e) at least one shelf support strut extending between said longitudinal frame members and said shelf margin portions, (f) platform defining panel means provided on said longitudinal extending members, and shelf panels provided on said shelf support portions, said shelf margin portions and said shelf support struts, and said platform defining panels being movable to positions inclined outwardly and upwardly to form upwardly projecting sides of the truck body to increase the capacity of the basic truck body, (g) side rails pivotably connected to said shelf margin portions, and means provided in part on said bulkhead for supporting said rails in upright positions.

6. The combination of claim 5 further characterized by panel support means defined by said bulkhead for supporting said panels in the plane of said longitudinal frame members, and panel support bars removably provided between said longitudinally extending frame members to cooperate with said bulkhead defined panel support means and so support said panels.

7. The combination of claim 5 wherein each leg portion comprises a U-shaped structure wherein each upright leg portion includes a first part fixed to the base of the U and a second part adjustably mounted to the first part to permit variations in the height (H) of said leg portions to match variations in the height (H) of different truck bodies.

8. The combination of claim 5 wherein said platform panel means and said shelf panels have a length greater than (B) to provide an overhang ΔB which may vary depending upon the particular truck body with which the bed is used.

* * * * *